United States Patent
Huang et al.

(10) Patent No.: US 10,680,452 B2
(45) Date of Patent: Jun. 9, 2020

(54) ZERO-POWER MODE

(71) Applicant: Intel Corporation, Santa Clara, CA (US)

(72) Inventors: Mingjing Huang, San Francisco, CA (US); Jason M. Seitz, San Francisco, CA (US); Daniel W. Labove, North Kingstown, RI (US); Paul G. Adelsbach, Castro Valley, CA (US); Edward S. Pataky, Santa Clara, CA (US)

(73) Assignee: Intel Corporation, Santa Clara, CA (US)

(*) Notice: Subject to any disclaimer, the term of this patent is extended or adjusted under 35 U.S.C. 154(b) by 850 days.

(21) Appl. No.: 15/180,563

(22) Filed: Jun. 13, 2016

(65) Prior Publication Data
US 2017/0358937 A1    Dec. 14, 2017

(51) Int. Cl.
*H02J 7/00* (2006.01)
*H02J 9/00* (2006.01)

(52) U.S. Cl.
CPC .......... *H02J 7/0031* (2013.01); *H02J 7/007* (2013.01); *H02J 7/0032* (2013.01); *H02J 7/0045* (2013.01); *H02J 9/005* (2013.01)

(58) Field of Classification Search
CPC ......... H02J 7/0031; H02J 7/0045; H02J 7/007
USPC .......................... 320/107, 114, 135, 136, 155
See application file for complete search history.

(56) References Cited

U.S. PATENT DOCUMENTS

| | | | |
|---|---|---|---|
| 8,237,414 B1 | 8/2012 | Li et al. | |
| 9,060,213 B2 | 6/2015 | Jones | |
| 2013/0169038 A1* | 7/2013 | King | B60L 58/18 307/10.1 |
| 2013/0257379 A1* | 10/2013 | Kato | H02J 7/0029 320/128 |

FOREIGN PATENT DOCUMENTS

CN   101901201 B   7/2014

OTHER PUBLICATIONS

Guo, Johnny, et al., "TPS23752 Maintain Power Signature Operation in Sleep Mode", Texas Instruments Application Report SLVA588, (Apr. 2013), 13 pgs.

* cited by examiner

*Primary Examiner* — Edward Tso
*Assistant Examiner* — Aaron Piggush
(74) *Attorney, Agent, or Firm* — Schwegman Lundberg & Woessner, P.A.

(57) ABSTRACT

Various systems and methods for implementing zero-power mode are described herein. A battery-powered apparatus includes a non-removable battery for powering processing circuitry of the apparatus, charging pins to connect the apparatus to a charging source, and control circuitry that is separate from the processing circuitry. The control circuitry can perform operations that detect the charging pins are shorted and activate a timer for a predetermined wait interval. The control circuitry can also, upon expiration of the timer, disconnect the battery from powering the processing circuitry to activate a device zero-power mode. Upon detecting the charging pins are no longer shorted, the control circuitry can resume power to the processing circuitry. The non-removable battery is only powering the control circuitry while the battery is disconnected from the processing circuitry.

25 Claims, 4 Drawing Sheets

ZERO-POWER MODE

TECHNICAL FIELD

Embodiments described herein generally relate to power modes in a battery-powered apparatus and in particular, to a zero-power mode.

BACKGROUND

A device's quiescent current ($I_Q$) is an important consideration in low-power, energy-efficient device applications. For example, and in relation to small battery-powered devices, quiescent current can consume the majority of the initial battery charge after the devices are manufactured, during the extended period from manufacturing until the end user open box experience that initiates device usage. Often times, a device's battery power can be substantially reduced due to, e.g., quiescent current, and the end user open box experience can be disappointing as lack of battery power can cause the device not to function as intended.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

In the following description, for purposes of explanation, numerous specific details are set forth in order to provide a thorough understanding of some example embodiments. It will be evident, however, to one skilled in the art that the present disclosure may be practiced without these specific details.

Known solutions for addressing battery drain of battery-powered devices due to, e.g., quiescent current during an extended period of time between manufacturing and end user experience, can be inefficient. For example, small battery-powered devices (e.g., watches and calculators) usually prevent battery drain by completely disconnecting the battery from the device circuitry using a removable plastic strip placed between a battery terminal and the battery. After the user receives the device, the user can pull out the plastic strip, connecting the battery and initiating device use. However, this solution is designed for devices that are powered with removable batteries, and this technique is not suitable in instances when the battery is non-removable (e.g., in instances when the battery is sealed within the device and cannot be accessed/replaced by the user).

Systems and methods described herein implement zero-power mode for battery-powered devices. Portable battery-powered devices (e.g., wearables) can include charging pins that are exposed on an outside surface of the device, and are used for charging a non-removable battery. As a part of the final packaging during the device manufacturing process, a protective plastic can be wrapped around the device to keep it from smudging and prevent accidental scratches. In an example, a small metal short can be added to the protective plastic wrap at the location of the exposed contact pins. The resulting electrical short between two or more of the charging pins can be used as a signal for the device to enter a special power state (i.e., zero-power state) where quiescent current can be significantly reduced to almost zero. More specifically, the device can include a first central processing unit (CPU) for performing functionalities associated with the device main characteristics. The device can also include a second CPU (or a control circuit) which can be used to control transition from normal power mode to zero-power mode and vice versa. When a user receives the device and removes the protective packaging to use the device, the short between the charging pins is removed and zero-power mode can be deactivated (e.g., by activating normal power mode).

As used herein, the term "normal power mode" indicates a device power mode when the device battery powers all functional units of the device (e.g., the first and second processor and any other functional modules requiring power). As used herein, the term "zero-power mode" indicates a device power mode when only the second processor (i.e., the control circuit) is powered, with battery power being disconnected from any other power-consuming device circuits. In order to achieve an efficient zero-power mode performance, the energy consumption of the control circuit (second CPU) can be significantly lower than the energy consumption of the main (first) CPU.

Figure 1:
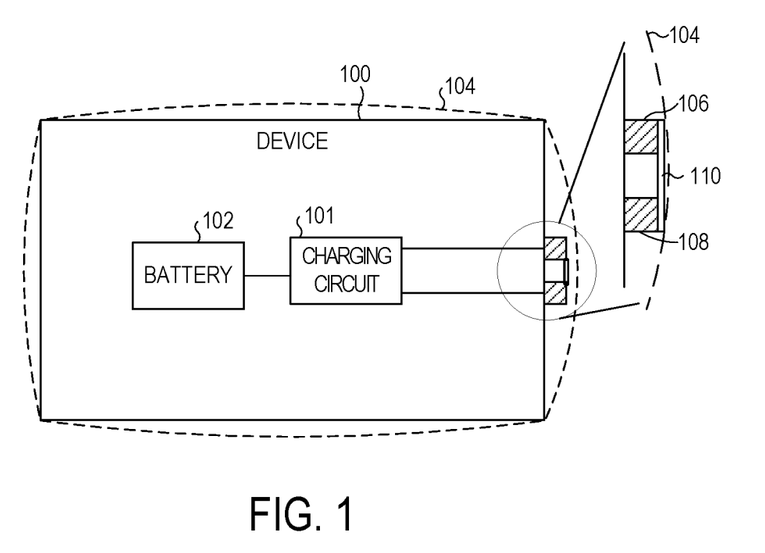
FIG. 1 is a block diagram of a device with a non-removable battery and charging pins, according to an embodiment.

FIG. 1 is a block diagram of a device with a non-removable battery and charging pins, according to an embodiment. Referring to FIG. 1, the example device 100 can be a battery-powered device, using a battery 102 and a charging circuit 101. The battery 102 can be a non-removable battery so that a user of the device 102 cannot access/remove the battery 102 (e.g., for replacement or charging). Additionally, the battery 102 can be a rechargeable battery, with charging pins 106, 108 being used for charging the battery 102 via the charging circuit 101 which can be coupled to an outside power source. The charging pins 106, 108 can be located on an outside surface of the device 100. Even though FIG. 1 illustrates only two charging pins, the disclosure is not limited in this regard and other charging configurations can be used as well.

In an example, the device 100 can include device packaging 104, which can be installed after the device is manufactured. The device packaging 104 can be a protective film applied to prevent smudges/scratches on the device surface. Additionally, the device packaging 104 can include a short 110, which can be placed over the protective pins 106 and 108.

In an example, the short 110 between the charging pins 106 and 108 can be used for activating zero-power mode for device 100, as explained herein below.

Figure 2:
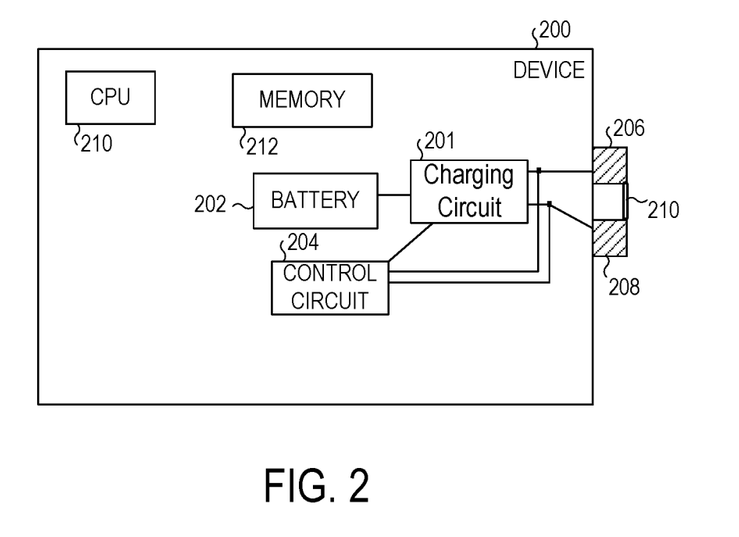
FIG. 2 is a more detailed diagram of the device of FIG. 1, according to embodiment.

FIG. 2 is a more detailed diagram of the device of FIG. 1, according to embodiment. Referring to FIG. 2, the example device 200 can be similar to device 100 of FIG. 1. Device 200 can include a main CPU 210, a control circuit (or secondary CPU) 204, memory 212, charging circuit 201, and non-removable battery 202. The non-removable battery 202 can be charged via the charging circuit 201 and charging pins 206 and 208.

The control circuit 204 can comprise suitable circuitry, logic and/or code and can be configured to manage one or more power modes for device 200 (e.g., a normal power mode and a zero-power mode). For example, the control circuit 204 can be coupled to the charging circuit 201 as well as the charging pins 206 and 208, and can monitor the charging pins for presence of a short in order to activate (or deactivate) the zero-power mode. Additionally, the control circuit 204 can have power requirements that are significantly reduced in comparison with the main CPU 210 (e.g., control circuit 204 may require about 8-10 μA, and the main CPU 210 may require about 60-100 μA of battery power).

Figure 3:
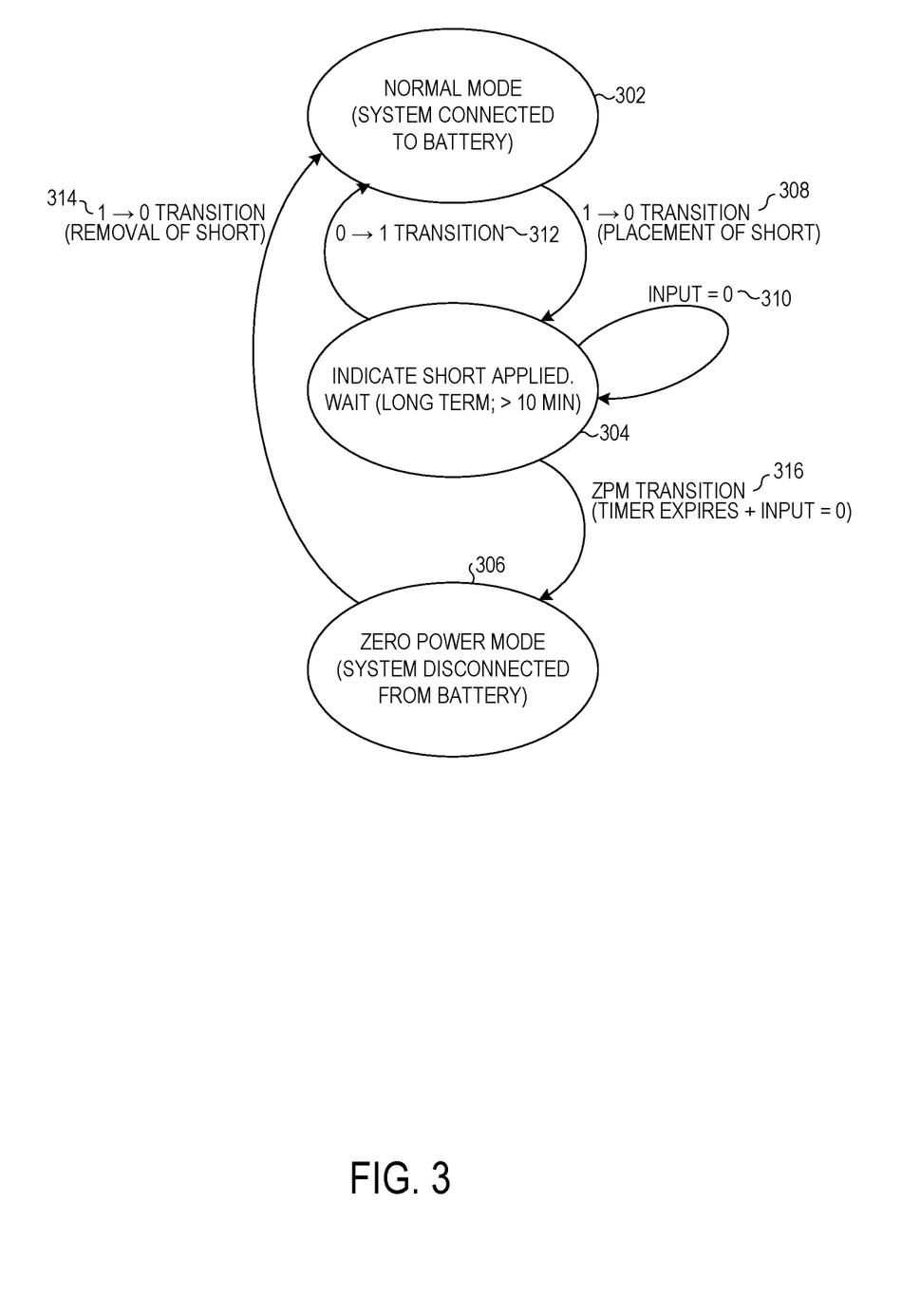
FIG. 3 is a state diagram illustrating transitions to and from zero-power mode, according to an embodiment.

FIG. 3 is a state diagram illustrating transitions to and from zero-power mode, according to an embodiment. Referring to FIG. 2 and FIG. 3, at state 302, the control circuit 204 can place the device 200 in normal power mode (e.g., normal power mode can be activated after the device is manufactured). While in normal power mode, all device circuits, including the main CPU 210 as well as the control circuit 204, are powered by battery 202. In example operation during normal power mode, only one of the control circuit 204 or the main CPU 210 can be powered by the battery 202. A short 210 can be placed between charging pins 206 and 208 to initiate transition 308 to state 304. For example, the short 210 can be part of device packaging (e.g., a device protective film applied on one or more outside surfaces of the device 200). The short 210 can include a metal strip, conductive tape, conductive paste, conductive (metallic) ink, or another type of conductive material.

At state 304, the control circuit 204 can initiate a timer for a predetermined interval (e.g., greater than 10 minutes). Additionally, the control circuit 204 can provide an indication (e.g., visual or audible indication) on the device 200 that a short 210 has been applied to the charging pins 206 and 208. At transition 310, the control circuit 204 can monitor the device 200 for any user input (e.g., input via a device touch screen or removal of the short 210 prior to expiration of the timer). In instances when a user input removing the short is detected, the control circuit 204 can transition the device back to state 302 (e.g., transition 312). In instances when a user input is detected (e.g., user touches the touchscreen) and the short 210 continues to be placed over the charging pins, then the control circuit 204 can initiate another timer and transition again to state 304 (i.e., timer is reset).

After the timer expires signifying that no user input has been detected, transition 316 can take place so that the device 200 is placed in zero-power mode (state 306). While in zero-power mode, the control circuit 204 can disconnect all remaining device circuits (including 201 and 210) from using the battery 202, so that control circuit 204 is the only remaining powered circuit within the device. Additionally, the control circuit 204 can monitor the shorted pins 206 and 208, and can detect whether the short 210 has been removed (e.g., when a user has purchased the device 200 and has removed the short 210). In instances when the control circuit 204 detects removal of the short 210, then the control circuit 204 can (at 314) transition the device to state 302 by activating normal power mode.

In one example, while in zero power mode, the inputs of the device may be unable of receiving user input. Only after removal of the shorted pins and entering normal power mode, will the device be able to receive user inputs.

In an example, a user of device 200 can initiate the switch from normal to zero-power mode by placing a short and initiating the state transitions as illustrated in FIG. 3. For example, the user may be traveling for an extended period of time or the device 200 may need to be stored for an extended period of time, necessitating the zero-power mode transition.

In an example, the control circuit 204 can be configured to perform additional functionalities, such as device reset functionalities and/or device recovery functionalities.

Figure 4:
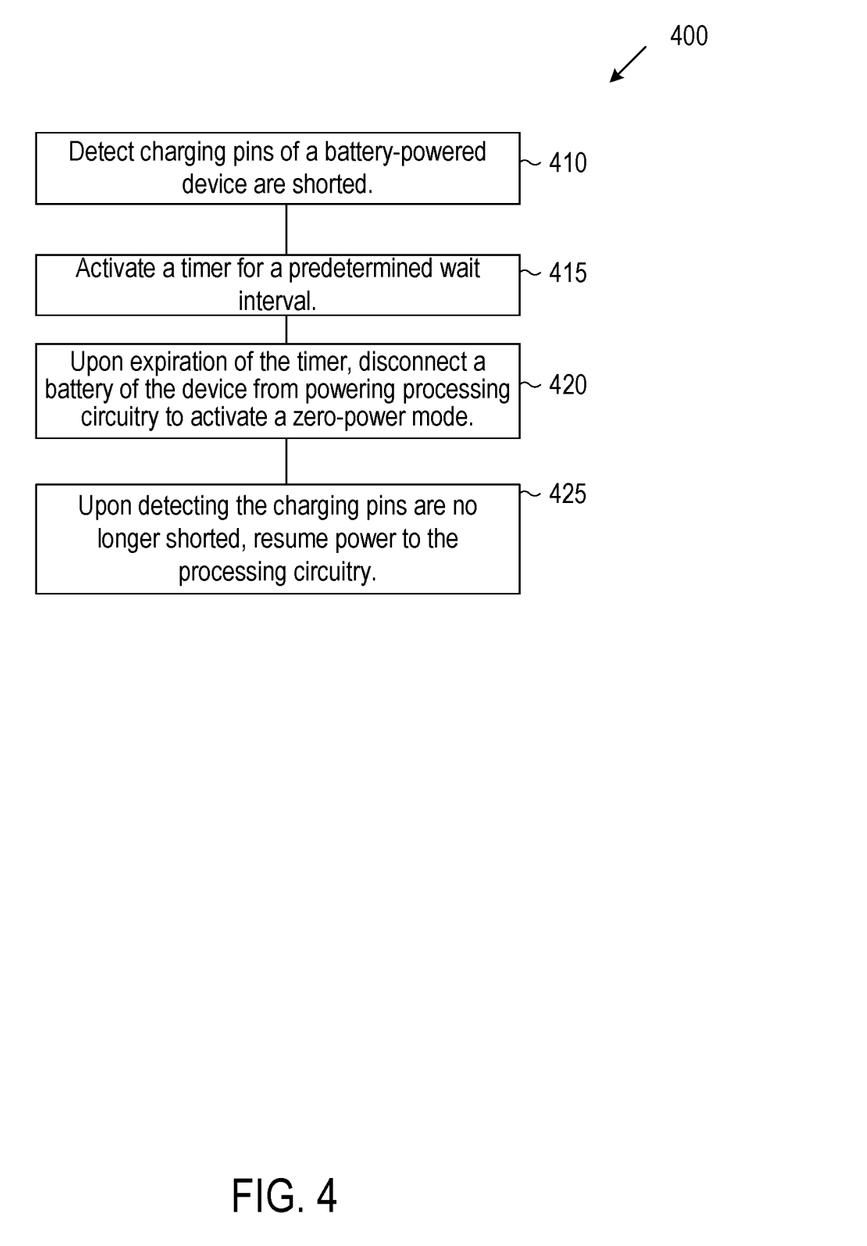
FIG. 4 is a flowchart illustrating a method of implementing zero-power mode, according to an embodiment.

FIG. 4 is a flowchart illustrating a method of implementing zero-power mode, according to an embodiment. Referring to FIG. 2 and FIG. 4, the example method 400 may start at 410, when the control circuit 204 can detect that the charging pins 206 and 208 of the battery-powered device 200 are shorted. At 415, the control circuit 204 can activate a timer for a predetermined wait interval. At 420, upon expiration of the timer, the control circuit 204 can disconnect the battery 202 of device 200 from powering processing circuitry (e.g., the main CPU 210) in order to activate a zero-power mode. While in zero-power mode, the battery 202 is only powering the control circuitry 204. At 425, upon detecting the charging pins 206 and 208 are no longer shorted (i.e., the short 210 is removed), the control circuit 204 can resume power to the processing circuitry (CPU 210) by activating normal power mode and suspending zero-power mode.

Figure 5:
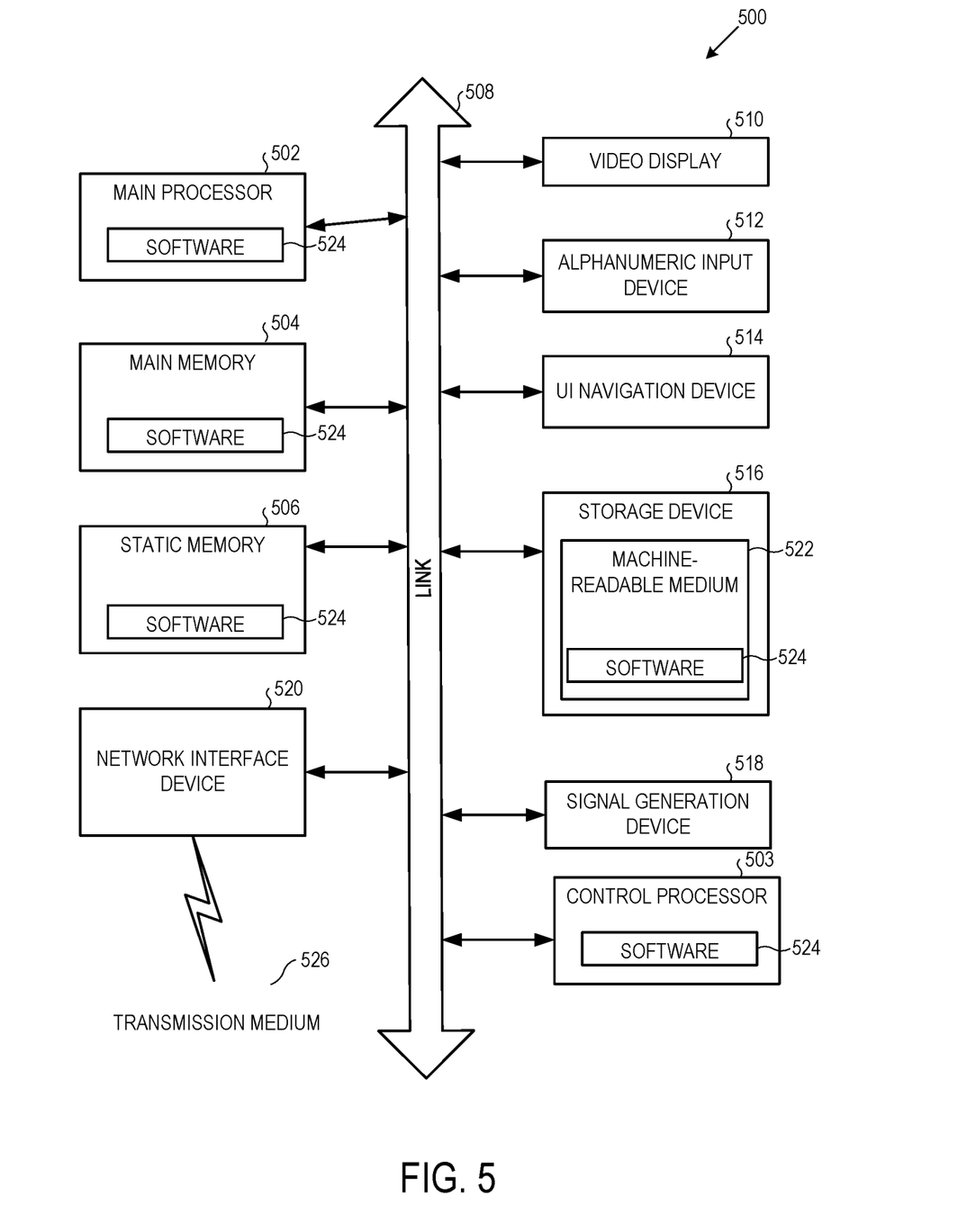
FIG. 5 is a block diagram illustrating an example device upon which one or more embodiments may be implemented.

FIG. 5 is a block diagram illustrating an example device upon which one or more embodiments may be implemented. In certain embodiments, programming of the device 500 according to one or more particular algorithms produces a special-purpose machine upon execution of that programming. In a networked deployment, the device 500 may be a battery-powered device, such as a wearable device, a tablet PC, a hybrid tablet, a personal digital assistant (PDA), a mobile telephone or, more generally, any machine capable of executing instructions (sequential or otherwise) that specify actions to be taken by that machine.

Example device 500 includes at least one processor 502 and 503 (e.g., a central processing unit (CPU), a graphics processing unit (GPU) or both, control processor, processor cores, compute nodes, etc.), a main memory 504 and a static memory 506, which communicate with each other via a link 508 (e.g., bus). The device 500 may further include a video display unit 510, an alphanumeric input device 512 (e.g., a keyboard), and a user interface (UI) navigation device 514 (e.g., a mouse). In an embodiment, the video display unit 510, input device 512 and UI navigation device 514 are incorporated into a touch screen display. The device 500 may additionally include a storage device 516 (e.g., a drive unit), a signal generation device 518 (e.g., a speaker), a network interface device (NID) 520, and one or more sensors (not shown), such as a global positioning system (GPS) sensor, compass, accelerometer, or other sensor. In an example, the functionalities of processors 502 and 503 can be similar to the functionalities of the CPU 212 and the control circuit 216, respectively.

The storage device 516 includes a machine-readable medium 522 on which is stored one or more sets of data structures and instructions 524 (e.g., software) embodying or utilized by any one or more of the methodologies or functions described herein. The instructions 524 may also reside, completely or at least partially, within the main memory 504, static memory 506, and/or within the processor 502 during execution thereof by the device 500, with the main memory 504, static memory 506, and the processor 502 also constituting machine-readable media.

While the machine-readable medium 522 is illustrated in an example embodiment to be a single medium, the term "machine-readable medium" may include a single medium or multiple media (e.g., a centralized or distributed database, and/or associated caches and servers) that store the one or more instructions 524. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

NID 520 according to various embodiments may take any suitable form factor. In one such embodiment, NID 520 is in the form of a network interface card (NIC) that interfaces with processor 502 via link 508. In one example, link 508 includes a PCI Express (PCIe) bus, including a slot into which the NIC form-factor may removably engage. In another embodiment, NID 520 is a network interface circuit laid out on a motherboard together with local link circuitry, processor interface circuitry, other input/output circuitry, memory circuitry, storage device and peripheral controller circuitry, and the like. In another embodiment, NID 520 is a peripheral that interfaces with link 508 via a peripheral input/output port such as a universal serial bus (USB) port. NID 520 transmits and receives data over transmission medium 526, which may be wired or wireless (e.g., radio frequency, infra-red or visible light spectra, etc.), fiber optics, or the like.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

A processor subsystem may be used to execute the instruction on the machine-readable medium. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

ADDITIONAL NOTES & EXAMPLES

Example 1 is a battery-powered apparatus, comprising: a non-removable battery for powering processing circuitry of the apparatus; charging pins to connect the apparatus to a charging source; and control circuitry that is separate from the processing circuitry, the control circuitry to perform operations that: detect the charging pins are shorted; activate a timer for a predetermined wait interval; upon expiration of the timer, disconnect the battery from powering the processing circuitry to activate a device zero-power mode; and upon detecting the charging pins are no longer shorted, resuming power to the processing circuitry.

In Example 2, the subject matter of Example 1 optionally includes wherein the non-removable battery is only powering the control circuitry while the battery is disconnected from the processing circuitry. As used herein, the term "disconnected" in relation to a battery refers to the battery being electrically isolated from other device circuitry to a degree that is considered practically disconnected.

In Example 3, the subject matter of any one or more of Examples 1-2 optionally include a protective film covering at least the charging pins.

In Example 4, the subject matter of Example 3 optionally includes wherein the protective film comprises a short placed over the charging pins.

In Example 5, the subject matter of Example 4 optionally includes wherein the short is one of: a printed metallic strip; conductive tape; or conductive paste.

In Example 6, the subject matter of any one or more of Examples 1-5 optionally include wherein the control circuitry further performs operations to: detect user input while the timer is activated and prior to expiration of the timer; and cancel the timer upon detecting the user input.

In Example 7, the subject matter of Example 6 optionally includes wherein the control circuitry further performs operations to: upon detecting the charging pins continue to be shorted, re-activate the timer for the predetermined wait interval.

In Example 8, the subject matter of any one or more of Examples 1-7 optionally include a charging circuit coupled to the charging pins and the battery, the charging circuit configured to charge the battery.

In Example 9, the subject matter of any one or more of Examples 1-8 optionally include wherein the control circuitry further performs operations to: provide an indication that the charging pins are shorted and the timer is activated.

In Example 10, the subject matter of any one or more of Examples 1-9 optionally include wherein the control circuitry further performs operations to: resume battery power to the processing circuitry and the control circuitry to activate a normal power mode.

In Example 11, the subject matter of any one or more of Examples 1-10 optionally include wherein the control circuitry further performs at least one of: enable zero-power mode; enable device reset; and enable device recovery.

Example 12 is a method of implementing zero-power mode in a battery-powered device, the method comprising: detecting charging pins of the battery-powered device are shorted; activating a timer for a predetermined wait interval; upon expiration of the timer, disconnecting a battery of the device from powering processing circuitry to activate a zero-power mode, wherein the battery is only powering control circuitry of the device during the zero-power mode, the control circuitry being separate from the processing circuitry; and upon detecting the charging pins are no longer shorted, resuming power to the processing circuitry.

In Example 13, the subject matter of Example 12 optionally includes wherein the battery is a non-removable battery.

In Example 14, the subject matter of Example 13 optionally includes wherein the charging pins couple a charging circuit for the non-removable battery of the device to a charging source.

In Example 15, the subject matter of any one or more of Examples 13-14 optionally include upon expiration of the timer, disconnecting power to the charging circuit.

In Example 16, the subject matter of any one or more of Examples 12-15 optionally include placing a short over the charging pins of the battery-powered device, while the device is in a normal power mode.

In Example 17, the subject matter of Example 16 optionally includes wherein both the control circuitry and the processing circuitry are powered by the battery during the normal power mode.

In Example 18, the subject matter of any one or more of Examples 16-17 optionally include wherein the short is within a protective film covering the charging pins.

In Example 19, the subject matter of any one or more of Examples 16-18 optionally include wherein the short is one of: a printed metallic strip; conductive tape; or conductive paste.

In Example 20, the subject matter of any one or more of Examples 12-19 optionally include detecting user input while the timer is activated and prior to expiration of the timer; and cancelling the timer upon detecting the user input.

In Example 21, the subject matter of Example 20 optionally includes upon detecting the charging pins continue to be shorted, re-activating the timer for a new predetermined wait interval.

In Example 22, the subject matter of any one or more of Examples 12-21 optionally include providing an indication that the charging pins are shorted and the timer is activated.

Example 23 is at least one machine-readable medium including instructions, which when executed by a machine, cause the machine to perform operations of any of the methods of Examples 12-22.

Example 24 is an apparatus comprising means for performing any of the methods of Examples 12-22.

Example 25 is a battery-powered apparatus for implementing a zero-power mode, the apparatus comprising: means for detecting charging pins of the battery-powered apparatus are shorted; means for activating a timer for a predetermined wait interval; means for, upon expiration of the timer, disconnecting a battery of the apparatus from powering processing circuitry to activate a zero-power mode, wherein the battery is only powering control circuitry of the apparatus during the zero-power mode, the control circuitry being separate from the processing circuitry; and means for resuming power to the processing circuitry upon detecting the charging pins are no longer shorted.

In Example 26, the subject matter of Example 25 optionally includes wherein the battery is a non-removable battery and the charging pins couple a charging circuit of the non-removable battery to an external charging source.

In Example 27, the subject matter of any one or more of Examples 25-26 optionally include means for placing a short over the charging pins of the battery-powered apparatus, while the apparatus is in a normal power mode.

In Example 28, the subject matter of Example 27 optionally includes wherein both the control circuitry and the processing circuitry are powered by the battery during the normal power mode.

In Example 29, the subject matter of any one or more of Examples 27-28 optionally include wherein the short is within a protective film covering the charging pins.

In Example 30, the subject matter of any one or more of Examples 27-29 optionally include wherein the short is one of: a printed metallic strip; conductive tape; or conductive paste.

In Example 31, the subject matter of any one or more of Examples 25-30 optionally include means for detecting user input while the timer is activated and prior to expiration of the timer.

In Example 32, the subject matter of Example 31 optionally includes means for cancelling the timer upon detecting the user input.

In Example 33, the subject matter of Example 32 optionally includes means for re-activating the timer for a new predetermined wait interval, upon detecting the charging pins continue to be shorted.

In Example 34, the subject matter of any one or more of Examples 25-33 optionally include means for providing an indication that the charging pins are shorted and the timer is activated.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A battery-powered apparatus, comprising:
   a battery that powers processing circuitry of the apparatus;
   charging pins connecting the apparatus to a charging source; and
   control circuitry that is separate from the processing circuitry, the control circuitry performing operations that:
   detect the charging pins are shorted;
   activate a timer for a predetermined wait interval;
   upon expiration of the timer, activate a device zero-power mode by disconnecting the battery from powering the processing circuitry; and
   upon detecting the charging pins are no longer shorted, resume powering the processing circuitry.

2. The battery-powered apparatus of claim 1, wherein the battery is only powering the control circuitry while the battery is disconnected from the processing circuitry.

3. The battery-powered apparatus of claim 1, comprising a protective film covering at least the charging pins.

4. The battery-powered apparatus of claim 3, wherein the protective film comprises a short placed over the charging pins.

5. The battery-powered apparatus of claim 4, wherein the short is one of:
   a printed metallic strip;
   a conductive tape; or
   a conductive paste.

6. The battery-powered apparatus of claim 1, wherein the control circuit y further performs operations to:
   detect user input while the timer is activated and prior to expiration of the timer; and
   cancel the timer upon detecting the user input.

7. The battery-powered apparatus of claim 6, wherein the control circuitry further performs operations to:
   upon detecting the charging pins continue to be shorted, re-activate the timer for the predetermined wait interval.

8. The battery-powered apparatus of claim 1, further comprising:
   a charging circuit coupled to the charging pins and the battery, the charging circuit configured to charge the battery.

9. The battery-powered apparatus of claim 1, wherein the control circuitry further performs operations to:
   provide an indication that the charging pins are shorted and the timer is activated.

10. The battery-powered apparatus of claim 1, wherein the control circuitry further performs operations to:
    resume battery power to the processing circuitry and the control circuitry to activate a normal power mode.

11. The battery-powered apparatus of claim 1, wherein the control circuitry further performs at least one of:
    enable zero-power mode;
    enable device reset; and
    enable device recovery.

12. At least one non-transitory device-readable storage medium, comprising a plurality of instructions that, responsive to being executed with circuitry of a battery-powered device, cause the device to perform operations that:
    power a first processor and a second processor using a battery during a normal power mode;
    detect a plurality of charging pins of the battery-powered device are shorted;
    while the charging pins are shorted, monitor for user input to the device during a predetermined time interval;
    upon expiration of the time interval and non-detection of user input, activate a zero-power mode by disconnecting the battery from powering the first processor while continuing to power the second processor; and
    upon detecting the charging pins are no longer shorted, resume powering the first processor.

13. The at least one non-transitory device-readable storage medium of claim 12, wherein the instructions further cause the device to perform operations that:
    detect user input while the charging pins are shorted.

14. The at least one non-transitory device-readable storage medium of claim 13, wherein the instructions further cause the device to perform operations that:
    upon detecting the user input, reset the time interval.

15. The at east one non-transitory device-readable storage medium of claim 13, wherein the instructions further cause the device to perform operations that:
    upon detecting the charging pins are no longer shorted, resume normal power mode.

16. The at least one non-transitory device-readable storage medium of claim 12, wherein the battery is a non-removable battery that is sealed within the device and is communicatively coupled to a charging circuit.

17. The at least one non-transitory device-readable storage medium of claim 16, wherein the instructions further cause the device to perform operations that:
   upon expiration of the time interval, disconnect power to the charging circuit.

18. The at least one non-transitory device-readable storage medium of claim 12, wherein the instructions further cause the device to perform operations that:
   provide an indication that the charging pins are shorted and zero-power mode is not activated.

19. A method of implementing zero-power mode in a battery-powered device, the method comprising:
   detecting charging pins of the battery-powered device are shorted;
   activating a timer for a predetermined wait interval;
   upon expiration of the timer, activating a zero-power mode by disconnecting a battery of the device from powering processing circuitry, wherein the battery is only powering control circuitry of the device during the zero-power mode, the control circuitry being separate from the processing circuitry; and
   upon detecting the charging pins are no longer shorted, resuming powering the processing circuitry.

20. The method according to claim 19, wherein the battery is a non-removable battery.

21. The method according to claim 20, wherein the charging pins couple a charging circuit for the non-removable battery of the device to a charging source.

22. The method according to claim 19, comprising:
   placing a short over the charging pins of the battery-powered device, while the device is in a normal power mode.

23. The method according to claim 19, comprising:
   detecting user input while the timer is activated and prior to expiration of the timer; and
   cancelling the timer upon detecting the user input.

24. The method according to claim 23, comprising:
   upon detecting the charging pins continue to be shorted, re-activating the timer for a new predetermined wait interval.

25. The method according to claim 19, comprising:
   providing an indication that the charging pins are shorted and the timer is activated.

\* \* \* \* \*

UNITED STATES PATENT AND TRADEMARK OFFICE
CERTIFICATE OF CORRECTION

PATENT NO. : 10,680,452 B2  
APPLICATION NO. : 15/180563  
DATED : June 9, 2020  
INVENTOR(S) : Huang et al.

Page 1 of 1

It is certified that error appears in the above-identified patent and that said Letters Patent is hereby corrected as shown below:

In the Claims

In Column 10, Line 12, in Claim 6, delete "circuit y" and insert --circuitry-- therefor In Column 10, Line 63, in Claim 15, delete "east" and insert --least-- therefor Signed and Sealed this  
Twentieth Day of April, 2021

Drew Hirshfeld  
*Performing the Functions and Duties of the*  
*Under Secretary of Commerce for Intellectual Property and*  
*Director of the United States Patent and Trademark Office*